C. F. KETTERING.
SYSTEM OF ELECTRICAL GENERATION AND CONTROL.
APPLICATION FILED DEC. 18, 1916.
1,338,987.
Patented May 4, 1920.
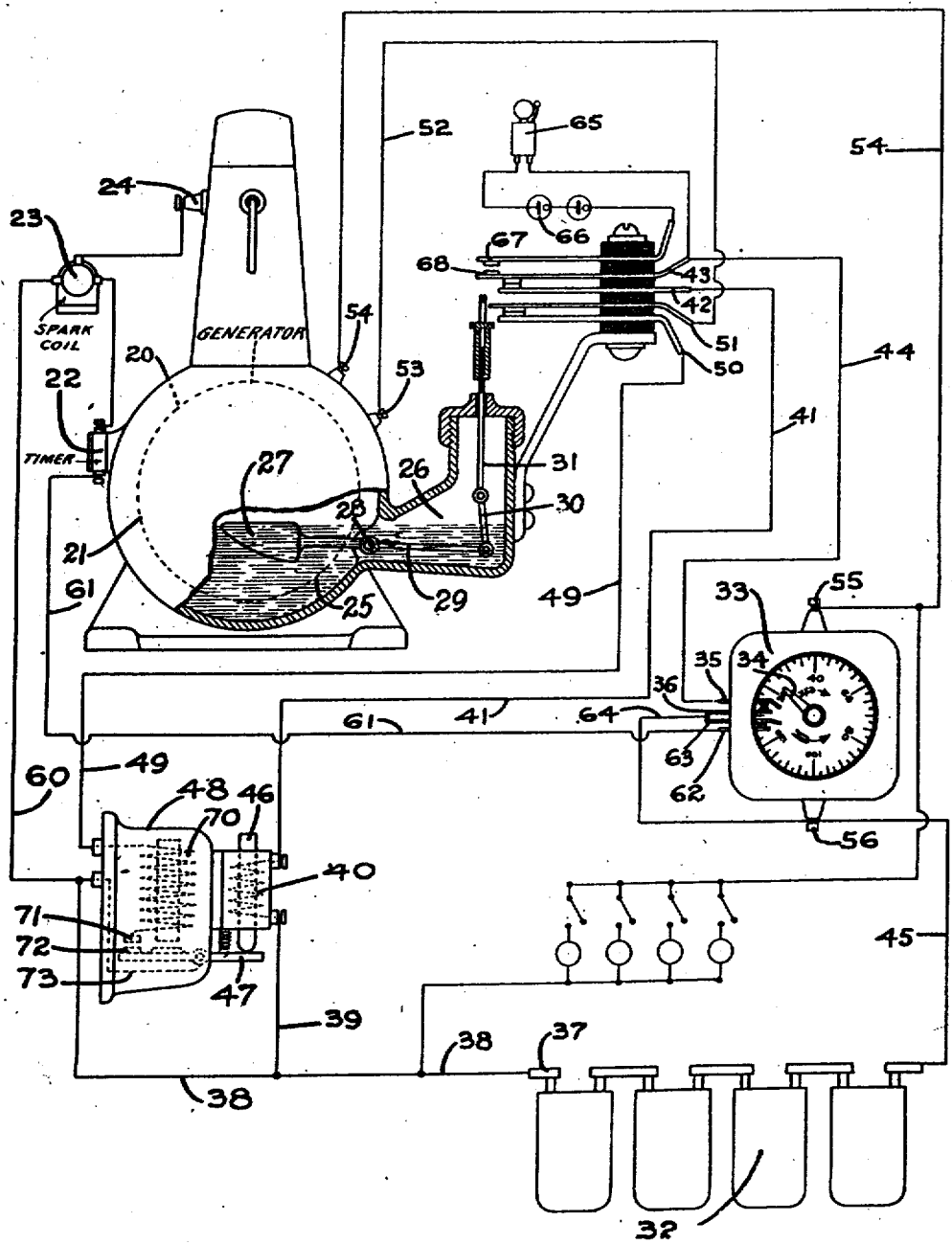

UNITED STATES PATENT OFFICE.

CHARLES F. KETTERING, OF DAYTON, OHIO, ASSIGNOR, BY MESNE ASSIGNMENTS, TO THE DELCO-LIGHT COMPANY, OF DAYTON, OHIO, A CORPORATION OF OHIO.

SYSTEM OF ELECTRICAL GENERATION AND CONTROL.

1,338,987.     Specification of Letters Patent.     Patented May 4, 1920.

Application filed December 18, 1916. Serial No. 137,594.

*To all whom it may concern:*

Be it known that I, CHARLES F. KETTERING, a citizen of the United States of America, residing at city of Dayton, county of Montgomery, and State of Ohio, have invented certain new and useful Improvements in Systems of Electrical Generation and Control, of which the following is a full, clear, and exact description.

The present invention relates to an improvement in electrical systems, and more particularly to that type wherein the electric machine is driven as a generator by an engine, to furnish current for charging and other purposes, and the engine is cranked by the electric machine operating as a motor for starting purposes.

One of the objects of the present invention is to provide protecting devices which will prevent the operation of the electric machine as a motor when the lubricant supply of the engine reaches a predetermined low point, and thereby will prevent the cranking of the engine by the electric machine until said lubricant supply is replenished.

Referring to the drawing wherein one preferred form of the present invention is clearly illustrated, the view, partly diagrammatic and partly structural, the numeral 20 designates an electric machine which is so constructed that it can operate as an electric motor or as a generator. This machine is connected to the engine 21, preferably of the combustion or explosion type, which includes an ignition system comprising the timer 22, coil 23, and the spark plug 24.

The engine 21 is provided with a crankcase 25, which has a chamber 26 associated therewith. A float element 27, fulcrumed at the point 28 is included within the crankcase 25, and is provided with an arm 29, which coöperates with a pair of levers 30 and 31, the latter of which projects through the screw cap on the chamber 26, and is so arranged in connection with circuit making and breaking devices, that when the lubricant supply within the crankcase reaches a predetermined low point, certain electrical connections will be made and broken for the purpose described hereinafter.

The construction of the engine 21 and the dynamo-electric-machine 20 is substantially the same as that disclosed in the copending applications of Charles F. Kettering and William A. Chryst, Serial No. 58,207, filed October 27, 1915, and Ernest Dickey, Serial No. 119,888, filed September 13, 1916, and therefore the detailed structure of these units will not be further described in connection with the present application.

The electric machine 20 is electrically connected with the storage battery 32, which receives current from the electric machine when the same is operating as a generator, and which will, under certain conditions, as will be clearly explained hereinafter, discharge current back from the electric machine to operate the same as a motor for starting purposes.

The system as shown in the present application is of the automatic type; that is, the operation of the engine and consequently the operation of the electric machine is effected automatically, in accordance with the condition of charge of the storage battery, and this automatic operation of the electric machine will be continuously carried out except at such times as the lubricant level in the crankcase 25 reaches a predetermined low point.

It will be understood that if the lubricant in the crankcase 25 reaches such a low point that the different elements within the crankcase are not effectually lubricated, and the charge of the batteries is such that the automatic starting would normally be brought into effect, mechanism is actuated by the float element contained within the crankcase to prevent any discharge from the battery and thereby to prevent the starting of the engine, due to the operation of the electric machine as a motor. However, if the cranking operation was allowed to continue, and the engine when started, would be allowed to operate with the lubricant supply low, certain parts of the engine might be damaged.

The electrical connections and the controlling mechanism for effecting the automatic stopping and starting of the engine, together with the mechanism actuated by the float element in the crankcase, will be explained in connection with the operation of the system, which may be described as follows:

Supposing that the batteries have reached a predetermined discharge state, the electrical measuring instrument designated by the numral 33, which, in the present instance, may be a quantity meter of the ampere-hour-meter type, will be operated to such a position that the hand 34 will engage with the contact plate 35 and force the same in contact with the plate 36. This will close the following circuit:

From the positive terminal 37 of the battery 32, through a conductor 38, branch conductor 39, to the solenoid coil 40, thence through conductor 41, and providing the crankcase 25 has a sufficient supply of lubricant to maintain the contact actuating arms 30 and 31 in the position shown in the diagrammatic figure, through the conductor plates 42 and 43, through conductor 44, across the contacts 35 and 36, thence back to the negative side of the battery via the conductor 45. The closing of this circuit will tend to energize the solenoid coil 40 and thereby effect a movement of the solenoid plunger 46 in a downward direction in the figure, so as to actuate the lever 47. This lever 47 will tend to close the following circuit:

From the positive side 37 of the battery 32, through the conductor 38, branch connection 73, lever 47, contacts 72 and 71, series winding 70, conductor 49, across the contact plates 50 and 51, through conductor 52, to the terminal 53 of the dynamo-electric-machine 20. The current will flow through the field and armature connections of the electric machine in substantially the same manner as that described in the aforementioned co-pending applications, and thence through conductor 54, to the terminal 55 of the electrical measuring instrument 33, thence across said instrument to the terminal 56, and back to the battery via the conductor 45. At the same time the following ignition circuit will be closed:

From the conductor 38, through the branch conductor 60, to the coil 23, thence to the timer 22, through conductor 61, across the contacts 62 and 63, which are associated with the electrical measuring instrument 33 in a manner to be described hereinafter to the conductor 45 via the branch wire 64, and thence back to the negative side of the battery.

Now, as soon as the above-mentioned circuits are completed, the electric machine will tend to operate as a motor and will crank the engine 21, and thereby bring the same into self-operation.

As soon as the engine has become self-actuating, it will speed up and will then drive the electric machine 20 as a generator. The output of the generator will tend to oppose the current flowing from the battery 32, and will energize the winding 70 of the controller switch 48 in such a manner as to maintain the lever 47 in attracted position and the contacts 71 and 72 closed. A more detailed description of the switch 48 will be found in the co-pending applications referred to.

Now, as soon as the electric machine tends to charge the storage batteries, the current flowing through the electrical measuring instrument 33, will cause the hand 34 of said instrument to move in the direction of the dotted arrow shown in the drawing of said instrument, until said hand engages with the contact plate 63 and forces the same out of contact making position with the plate 62. This operation will only take place at such times as the battery has reached a predetermined condition; that is, a substantially saturated condition.

The result of opening the contacts 62 and 63 will be to break the ignition circuit, which will of course result in bringing the engine to a stop, and also causing the electric machine to be brought to a stop.

As soon as the electric machine slows down, the voltage through the aforementioned charging circuit will drop below the voltage of the storage batteries 32 and cause the current from the storage batteries to try to flow back through the electric machine and operate the same as a motor. This will be prevented, however, by means of the controller switch 48, which, as has been described in the co-pending applications mentioned heretofore, is provided with a reverse current winding which will tend to open the main circuit through the electric machine and thereby prevent the discharge of the storage batteries.

Supposing, however, that the batteries become discharged and that the supply of lubricant in the crankcase 25 reaches a predetermined low point; that is, reaches such a point that the float 27 will be in such a position that the arms 29, 30 and 31 will be raised to affect the contact plates 51 and 43.

Due to the position of the arm 34 of the electrical measuring instrument 33, the contact plates 35 and 36 will be closed, but current will be prevented from flowing from the battery through the solenoid coil 40 and the conductors 41 and 44, by the separation of the contact plates 42 and 43, through the adjustable element on the lever 31, controlled by the float element in the crankcase. This will prevent the operation of the electric machine as a motor to crank the engine, due to the fact that no current is flowing through the solenoid 40, and the controller switch will therefore remain in contact breaking position.

It is, however, possible to manually operate the lever 47, in which case the current would flow from the battery through the necessary circuits to the electric machine and operate it as a motor, when the lubricant in the crankcase is low. In order to prevent this, the contacts 50 and 51 are provided, across which the main cranking and charging circuit flows. These contacts are concurrently opened by the lever 31, upon the opening of the contacts 42 and 43, as described heretofore, and will consequently prevent the operation of the electric machine as a motor by the manual operation of the controller switch 48.

Under certain conditions it is advisable to notify the attendant, or operator, of the fact that the supply of lubricating oil in the crankcase 25 is not sufficient to permit the safe operation of the engine 21, and a signaling device, shown in the present instance as including a bell 65, is therefore provided which is located in a local circuit including batteries 66 and the contact points 67 and 68. This indicating device or signal 65 will therefore be brought into operation by the closing of the contacts 67 and 68, which is effected by the operation of the lever 31 engaging with the contact plate 43.

As soon as the operator replenishes the crankcase 25 with a sufficient quantity of lubricant, the float 27 will rise to such a position that the levers 29, 30 and 31 will be retracted into substantially the position shown in the diagrammatic figure, and thereby permit the contact plates 43 and 51 to assume their normal relative positions, and also to break the electrical circuit through the indicating device to permit the contact points 67 and 68 to separate.

A lighting circuit or any work circuit is shown as being tapped off of the main lines 54 and 38.

While the form of mechanism herein shown and described, constitutes a preferred form of embodiment of the invention it is to be understood that other forms might be adopted all coming within the scope of the claims which follow.

What I claim is as follows:

1. In a device of the character described, the combination with an engine and lubricant supply provisions therefor; of an electric starting device therefor, operable as a motor for starting purposes; a storage battery electrically connected with said starting device; and means for breaking the electrical connections between the battery and the starting device, when the lubricant supply reaches a predetermined low point, thereby entirely preventing the operation of the starting device as a motor for starting purposes, said means including a normally closed switch connected directly in the circuit between the starting device and battery, and means controlled by the lubricant level for opening said switch.

2. In a device of the character described, the combination with an engine and lubricant supply provisions therefor; of a dynamo-electric-machine connected thereto; an electric storage battery electrically connected to the dynamo-electric-machine; means responsive to the condition of charge of said battery to automatically stop and start said engine; and means for entirely preventing the operation of the dynamo-electric-machine as a motor to start the engine when the lubricant supply reaches a predetermined low point, said means including a normally closed switch connected directly in the circuit between the dynamo and the battery and means controlled by the lubricant level for opening said switch.

3. In a device of the character described, the combination with an engine and lubricant supply provisions therefor; of a dynamo-electric-machine operable as a starting device for the engine; a storage battery; a circuit controller for controlling the electrical connections between the battery and the dynamo, said controller being capable of manual operation to start the engine; automatic means for operating the controller when the battery discharge reaches a predetermined low point, whereby to start the engine; and means controlled by the level of the lubricant for rendering the automatic means inoperative to operate the controller, and for directly interrupting the circuit between the dynamo and the battery, whereby manual operation of the controller will be ineffective.

4. In a device of the character described, the combination with an engine and lubricant supply provisions therefor; of a dynamo-electric-machine operable as a starting device for the engine; a storage battery; a circuit controller for controlling the electrical connections between the battery and the dynamo, said controller being capable of manual operation; automatic means for operating said controller including an electromagnet for actuating the controller, a switch for controlling the magnet and means for operating said switch when the battery discharge has reached a predetermined low point; and means controlled by the lubricant level for directly interrupting the circuit between the dynamo and the battery, whereby manual operation of the controller will be ineffective, and for rendering said automatic means inoperative to operate the controller, said lubricant level control means including a normally closed switch in the magnet circuit and provisions coöperating therewith for opening said switch when the lubricant level has reached a predetermined low point.

5. In a device of the character described, the combination with an engine and lubricant supply provisions therefor; of a dynamo-electric-machine operable as a starting device for the engine; a storage battery; means for controlling the electrical connections between the dynamo and the engine including a switch connected directly in said connections; and means controlled by the lubricant level for directly operating upon said switch to prevent starting the engine when the lubricant level has reached a predetermined low point.

6. In a device of the character described, the combination with an engine and lubricant supply provisions therefor; of a dynamo-electric-machine operable as a starting device for the engine; a storage battery; means for controlling the electrical connections between the dynamo and the engine including a switch connected directly in said connections; electrical signaling provisions having a switch in circuit therewith; and means controlled by the lubricant level for directly operating both of said switches to prevent starting the engine when the lubricant level has reached the predetermined low point, and to indicate this condition of the lubricant level.

7. In a device of the character described, the combination with an engine and lubricant supply provisions therefor; of a dynamo-electric-machine operable as a starting device for the engine; a storage battery; a circuit controller for controlling the electrical connections between the battery and dynamo, said controller being capable of manual operation to start the engine; a switch directly in circuit with the controller and battery; automatic means for operating the controller when the battery discharge reaches a predetermined low point, said automatic means including a switch in circuit therewith; electrical signaling provisions having a switch in circuit therewith; and means controlled by the lubricant level for directly operating all of said switches whereby to prevent manual or automatic starting of the engine when the lubricant has reached a predetermined low level and to indicate this condition of the lubricant level.

In testimony whereof I affix my signature in the presence of two subscribing witnesses.

CHARLES F. KETTERING.

Witnesses:
WALTER W. REIDEL,
J. W. McDONALD.